US005206812A

United States Patent [19]

Abumehdi

[11] Patent Number: 5,206,812

[45] Date of Patent: Apr. 27, 1993

[54] FRANKING MACHINE

[75] Inventor: Cyrus Abumehdi, Harlow, United Kingdom

[73] Assignee: Alcatel Business Systems Limited, United Kingdom

[21] Appl. No.: 557,085

[22] Filed: Jul. 25, 1990

Related U.S. Application Data

[63] Continuation-in-part of Ser. No. 175,338, Mar. 30, 1988, abandoned.

[30] Foreign Application Priority Data

Apr. 3, 1987 [GB] United Kingdom ................. 8708031

[51] Int. Cl.[5] ........................ G06F 13/00; G06F 13/14

[52] U.S. Cl. ................................ 364/464.02; 395/325

[58] Field of Search ...................... 364/464.02, 464.03, 364/466, 200, 900; 395/325

[56] References Cited

U.S. PATENT DOCUMENTS

| | | | |
|---|---|---|---|
| 4,466,079 | 8/1984 | Daniels et al. | 364/466 |
| 4,569,022 | 2/1986 | Coppola et al. | 364/464.03 |
| 4,570,217 | 2/1986 | Allen et al. | 364/188 |
| 4,574,352 | 3/1986 | Coppola et al. | 364/466 |
| 4,584,648 | 4/1986 | Dlugos | 364/900 X |
| 4,691,316 | 9/1987 | Phillips | 371/22.1 X |
| 4,731,728 | 3/1988 | Muller | 101/91 X |
| 4,752,950 | 6/1988 | Le Carpentier | 379/106 |
| 4,805,109 | 2/1989 | Kroll et al. | 364/464.02 |
| 4,807,141 | 2/1989 | Muller | 364/464.02 |
| 4,817,004 | 3/1989 | Kroll et al. | 364/464.02 |
| 4,831,554 | 5/1989 | Storace et al. | 364/519 |
| 4,907,271 | 3/1990 | Gilham | 380/25 |
| 5,027,315 | 6/1991 | Agrwal et al. | 364/900 |

*Primary Examiner*—Edward R. Cosimano
*Attorney, Agent, or Firm*—Shoemaker and Mattare Ltd.

[57] ABSTRACT

A franking machine is provided with a general purpose communication port to enable the machine to communicate with other devices. The general purpose port is configurable by the control circuits of the franking machine to match the communication standard utilized by the device connected to the franking machine. Input of a command to cause the franking machine to carry out an operation causes the control circuit to configure the port to a communication standard appropriate to the selected operation.

5 Claims, 5 Drawing Sheets

FRANKING MACHINE

CROSS REFERENCES TO RELATED APPLICATIONS

This is a continuation in part of co-pending application Ser. No. 07/175338 filed Mar. 30, 1988 now abandoned.

BACKGROUND OF THE INVENTION

This invention relates to franking machines and in particular to the provision of facilities to enable communication between such machines and other devices for the transfer of data.

In order to prevent fraudulent use of franking machines, the electronic circuits for carrying out accounting functions and for registering data relating to transactions carried out by the machine are housed within a secure casing to prevent unauthorised access to the circuits. Commonly, means are provided to prevent unauthorised transactions which, in the event of attempted fraudulent use, render the franking machine inoperative. The machine then has to be returned to a service depot for validation of the data stored in the electronic circuits and to be rendered operative for franking operations once again.

For use with postal authorities which require prepayment for franking, the franking machine is provided with means to receive a value of credit available for franking which, in the course of subsequent franking operations, is decremented by the value of franking effected. When the credit value is less than the intended value of franking, the franking machine or at least that part containing the accounting and register circuits needs to be taken to the postal authority for the entry of further credit. In order to permit this authorised entry of credit, the machine is provided with means such as a switch located behind a sealed access for operation by the postal authority to place the accounting and control circuits in a state to accept and register the credit. After updating the credit the access is re-sealed by the postal authority to prevent unauthorised credit updating. It has also been proposed to update credit remotely, without the necessity of returning the machine to the resetting authority, by using the telephone to communicate data from the postal authority to the user to enable the user to enter the updated credit. This is accomplished by orally informing the user of a code which contains, in encrypted form, data relating to that specific machine and to the current update of credit. The user then has to key in on the keyboard of the machine the code communicated to him and, provided the code is validated by the machine, the new credit amount is added to that registered by the machine.

Thus it will be appreciated that the only permitted access to the machine for a user is by means of the keyboard. As a result transfer of data into and out of the franking machine previously required the intervention of an operator to key in the data or to read data from a display on the machine.

The need for an operator to key in a code which, because it has no logical meaning to the operator, is liable to be keyed in with errors has been overcome by systems for secure transmission of information used in updating of credit data in a franking machine disclosed in U.S. Pat. No. 4907271. In one of the systems disclosed therein, the data is stored in a portable member which has an electronic storage device contained in it and the franking machine is provided with an electrical connector which allows a user to connect the portable member to the internal circuits of the franking machine. To prevent fraudulent alteration to the data stored in the portable member, the data is stored in encrypted form which may use a code unique to that franking machine. The internal circuits of the franking machine include decoding algorithms and circuits responsive only to correctly encrypted data to allow updating of credit data in the registers of the franking machine. In another of the systems disclosed in U.S. Pat. No. 4907271 the franking machine is connected via a modem with Post Office equipment over a communications link such as a telephone system, the modem connecting the franking machine to the telephone network being plugged into the connector provided in the franking machine housing. Fraudulent updating of the credit data in the franking machine is prevented by encrypting the secure data prior to transmission from the post Office equipment. The encryption of the data also prevents fraudulent entry of data by the application of electrical signals directly to the contacts of the connector of the franking machine. The transfer of data as described hereinbefore is concerned with secure data such as data relating to credit held in a descending register. Furthermore transfer of other encrypted data such as the accumulated value of franking held in an ascending register and transaction code data may be transferred from the franking machine by reading such encrypted data out into the storage device of the portable member or for transmission over the telephone system. In addition to transfer of secure data it is also desirable to be able to transfer non-secure data to and from the franking machine. For example it may be desired to connect a weighscale to permit the input of signals from the weighscale indicating the value of franking, dependent upon the weight of a mail item, to the accounting circuit. Another example is the output of signals from the franking machine to a printer to maintain a hard copy tally of franking transactions. Such signals do not represent data utilised in accounting for use of the franking machine upon which payment for such use is based. Accordingly there is no requirement to prevent tampering with these signals and the data represented thereby is considered to be non-secure data.

It would be convenient for credit updating to the registers in the machine, for providing data on the status of the registers in the machine to the postal authority and for transfer of non-secure data to be able to provide means whereby transfer of data could be carried out not only by use of the portable member referred to hereinbefore but also by direct electrical connection of the franking machine with other devices.

However a difficulty arises because the devices which it is desired to connect to the franking machine may operate to communicate data using different interface standards. For example some devices may operate to the so-called RS232 standard, some devices may operate to the so-called RS422 standard and other devices may operate to other standards such as current loop, standards specific to particular manufacturers of such devices, or even in the future may be designed to operate to standards which have not yet been devised. As a result it has been necessary to construct the franking machine with an interface designed specifically for communication with devices operating to only one standard. Accordingly whenever communication is desired with a device operating to a different standard, a different specific interface must be built into the franking machine. This is particularly inconvenient in relation to franking machines because each and every different design and construction of franking machine must be submitted for evaluation and approval to the relevant postal authorities before those machines may be marketed for use by customers. This is an inconvenient and time consuming operation and when new devices become available and are desired to be used by connection with a franking machine, if they operate to a new communication standard, they can only be used after the inevitable delay involved in designing and obtaining approval for the franking machine with an interface operating to the new standard.

DESCRIPTION OF THE RELATED ART

U.S. Pat. No. 4731728 discloses an electronic postage meter which incorporates a computer. The computer includes separate microprocessor modules which function to control a keyboard and display, to carry out accounting and to control selection of print elements of a print drum respectively. The microprocessor modules have programmable serial ports which are connected to provide communication within the computer between the accounting module and the keyboard display module and between the accounting module and the printing module. The printing module also utilises two programmable parallel ports for energisation of an LED and for receiving a sensing signal from a light responsive sensor respectively. The ports are permanently connected and perform specific invariable functions in the postage meter. No means is disclosed to enable communication between the computer of the meter and devices external to the meter.

U.S. Pat. No. 4466079 discloses an automated mailing system in which a peripheral controller interface is provided to enable a system processor incorporated in a weighscale module to communicate with various devices such as an electronic postage meter and a printer programmed to communicate with the peripheral controller. The system processor communicates with the peripheral controller by means of a parallel data bus while a transmit line and a receive line are provided for communication with the other devices of the system. The peripheral controller interface includes a memory storing communications formatting programs which is addressed by the system processor. The systems processor utilises the communications formatting programs stored in the memory to format command signals and data for the purpose of communicating with a selected peripheral device. The automated mailing system is controlled by the system processor of the weighscale module and command signals and data are transmitted between the system processor and each of the peripheral devices. The data transmitted to the postage meter from the system processor comprises calculated postage amounts for mail items and data received by the system processor from the meter comprises data which enables the system processor to check that the meter has been set to the required postage amount. Thus the data transmitted to and from the peripheral controller does not relate to accounting records for usage of the postage meter and is data for which there is no requirement to ensure security. Furthermore the peripheral controller provides only one common means of connection with peripheral devices, namely a transmit and a receive line. The controller does not provide any facility for communication with devices requiring different connections.

U.S. Pat. No. 4570217 discloses a process control system in which devices of the system are connected by means of ports to a public bus. A user of the system may configure the communication protocol of a port by selectively setting baud rate, parity bit, mode and stop bit.

SUMMARY OF THE INVENTION

According to one aspect of the invention a franking machine for franking items of mail includes electronic means to carry out accounting functions in relation to usage of the machine in franking operations; storage registers to store account records; said electronic means being responsive to command signals to carry out functions indicated by said command signals; a secure housing securely containing said electronic means and said storage registers; a general purpose communications port comprising a multi-contact connector extending through a wall of said housing to which peripheral device external to the franking machine may be connected to communicate with said electronic means; a plurality of electrical connections connecting the contacts of the connector to the electronic means; a group of said contacts having signal carrying functions determined by said electronic means; said electronic means being operative in response to a command signal indicating a function to be carried out to determine whether the indicated function requires transmission of signals by way of the general purpose port and a specific peripheral device with which communication is to be effected to set the signal carrying function of the contacts of said group to enable transmission of signals by way of the general purpose port to and from the specific peripheral device.

According to another aspect of the invention a method of controlling communication through a general purpose port of a franking machine with an external peripheral device comprises the steps of:- selecting a function to be performed by the franking machine; determining that the function requires communication with an external device; determining the specific device with which communication is desired to be effected; determining the signal carrying functions of connections of the port required for communication with said specific device; and setting the signal carrying functions of said connections to correspond to those required by said specific peripheral device.

BRIEF DESCRIPTION OF THE DRAWINGS

An embodiment of the invention will now be described with reference to the drawings in which.

DESCRIPTION OF THE PREFERRED EMBODIMENT

Figure 1:
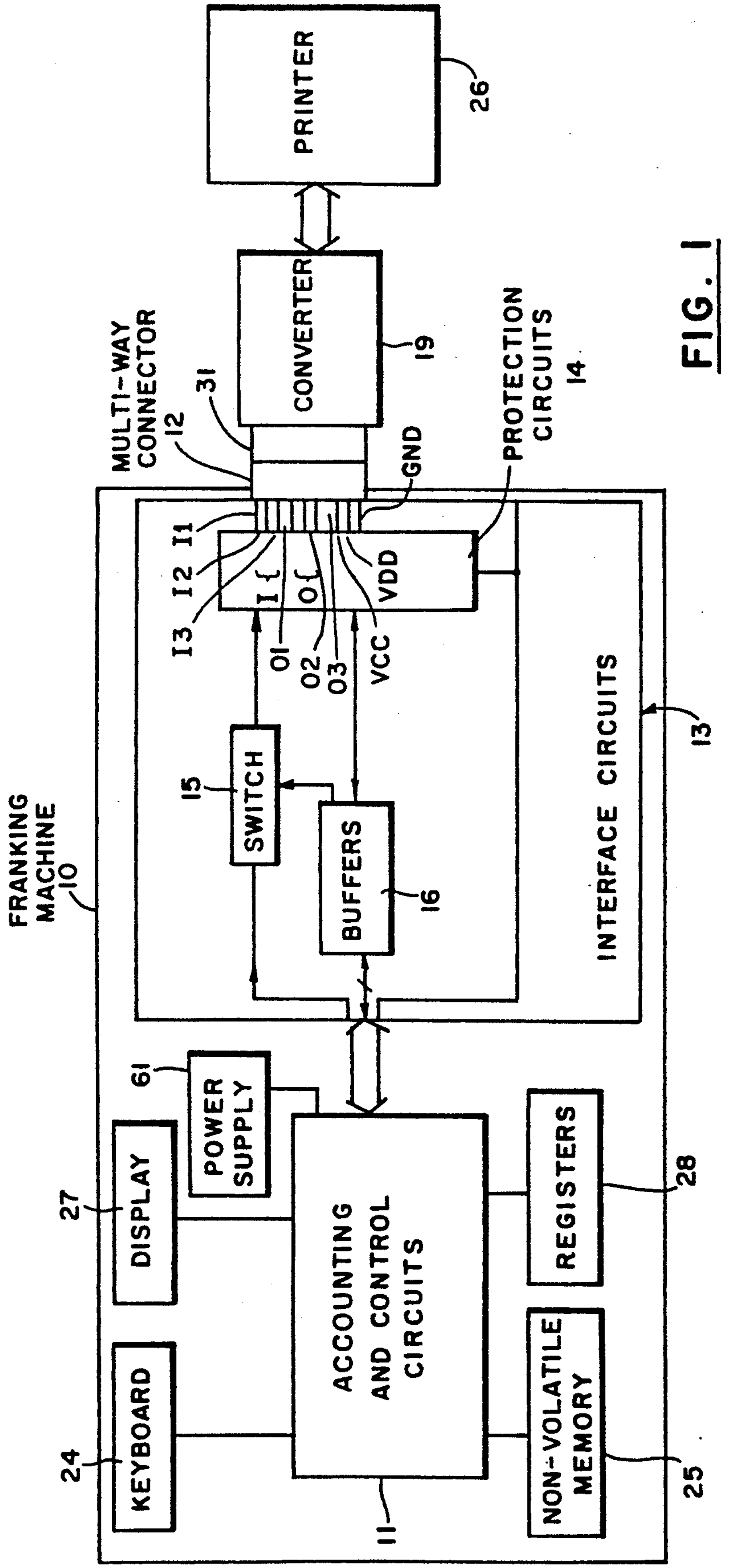
FIG. 1 shows a block diagram of a franking machine with a general purpose port and external interface connected to an external device.

A secure housing indicated by outline 10 contains electronic circuits 11 including a microprocessor for carrying out accounting functions on data held in registers 28 and data input by means of a keyboard 24. A display 27 is provided for the display of data input on the keyboard and for providing operational and instruction data to a user. Such circuitry is known in the art of franking machines. The registers include a descending register for available credit and an ascending register for the total accumulated usage of franking. These registers are duplicated to provide assurance that the data stored therein is error free and in addition further duplication of the registers may be provided to ensure correct data storage in the event of mal-function of any register. The registers also include a register for storing a transaction code. The circuitry 11 also carries out control functions and provides print element setting signals to set printing elements of a printer unit (not shown) of the franking machine to the value of franking keyed into the keyboard. The circuit generates a print initiation signal to cause operation of the printing elements when a franking operation has been validated.

In order to permit transfer of both secure and non-secure data to and from the franking machine by means of electrical signals, a single multi-way connector 12 is provided in a wall of the housing 10. The connector 12 has a plurality of contacts to provide connections for input signals and output signals. For example, the connector may provide a first set of three contacts for lines I1, I2, I3 for input signals and a second set of three contacts for lines 01, 02, 03 for output signals. Additional contacts VCC, VDD and GND are used to provide supply potentials of, say, 5 volts and ground potential.

The contacts of the connector 12 are connected to the circuits 11 of the franking machine by means of interface circuits 13. Connections to all the contacts, apart from that connected to ground potential, include high voltage protection circuits 14. These protection circuits prevent unauthorised or inadvertent application of damaging voltages to the internal circuits of the franking machine from the contacts of the connector 12. The protection circuits may include a spark gap and a "Tranzorb" each connected between the contact and ground to protect the franking machine from voltages in excess of 12 volts and a zener diode to provide protection against lower voltages in the range of 5.6 volts to 12 volts. Protection against excessive current flow in the connection is provided by means of a fuse. The 5 volt potential is provided from the internal power supply 61 of the franking machine via a semi-conductor switch 15 controlled to connect the 5 volt potential to the contact of the connector 12 only when an external device connected to the connector is enabled by control signals from the franking machine circuits 11.

Alternatively, if desired, an independent source of potential may be provided which, if the current demand is low, may be a battery.

The interface circuits 13 include signal buffering 16 for data and control signals to and from the circuitry 11 of the franking machine and also buffer clock signals from the circuitry 11. This buffering is achieved by means of open collector gates. In a practical implementation, these signals share a bus to the microcontroller in the circuits 11 with signals for the display and control functions. Therefore the signals to and from the interface circuits 13 time share the bus with the internal signals of the franking machine. Accordingly the signal buffering 16 is enabled for the allocated time share period.

Figure 5:
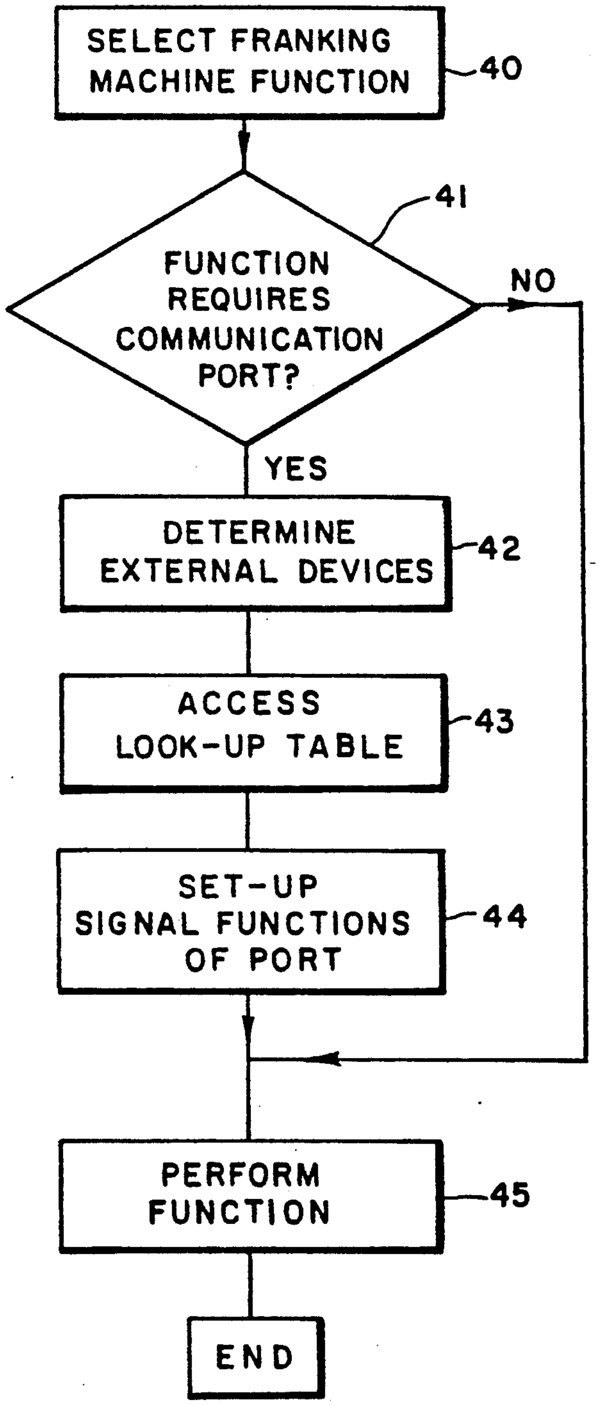
FIG. 5 is a flow chart of steps in selecting a franking machine function and corresponding configuration of a general purpose port of the machine.

The function of each of the lines I1, I2, I3 and the lines 01, 02, 03 during a communication with another device connected externally of the secure housing to the connector 12 is configured by operation of an internal control system of the franking machine in dependence upon the communication standard utilised by the other device. If the device connected to the franking machine operates to the RS232 standard, the input and output lines are configured to conform to that standard. For example, the line 01 will be allocated the function of "transmit data" (TXD), I1 will be allocated the function of "receive data" (RXD), the line 02 will be allocated the function of "data terminal ready" (DTR) and if desired the line I2 will be allocated the function "ready to send" (RTS). If the device connected to the franking machine operates to RS422 or some other communication standard the lines are allocated functions appropriate to the required standard. In addition to allocating the lines to specified functions, the configuration of the general purpose port also defines the data speed and characteristics of the lines. The operation of the internal control system is controlled by a user of the franking machine by input on the keyboard 24. The control circuitry 11 includes a non-volatile memory 25 which has stored therein data for configuring the lines of the communication port to each of a number of selectable communication standards. Preferably the input on the keyboard by the user of a desired mode of operation or function of the franking machine causes the accounting and control circuitry to access the memory 25 to effect configuration of the general purpose port to the communication standard associated with that selected operation or function of the machine. The steps involved in selecting a machine operation and the configuration of the general purpose port are illustrated in FIG. 5. When a user selects a function, step 40, required to be carried out by the franking machine the control circuitry 11 will determine, step 41, whether it is a function requiring communication via the multi connection connector 12 and determine, step 42, the device or devices required to be connected to the connector for that function. The control circuitry then accesses, step 43, a look-up table stored in memory 25 to determine the communication standard required by the device or devices connected to the connector and sets, step 44, the configuration of the connections of the connector 12 to the required standard. For example, if a printer 26 to be connected to the communication port communicates in RS232 standard, selection of a function reguiring operation of a printer will result in configuration of the port to RS232 standard whereas if the function selected by the user requires a weigh function, and hence a weighscale to be connected &o the connector, in which the output of a weighscale 29 (FIG. 2) is to be received by the franking machine, or a remote display function in which data is displayed on a remote display device 30, the control system will access the memory 25 to read out data to effect configuration of the communication port such that it operates in current loop mode as used by the weighscale 29 and the remote display device 30. After setting up the communication standard required for the communication port, the control circuitry 11 performs, step 45, the selected function. If the determination, step 41, indicates that communication with an external device is not required, the control circuitry 11 proceeds to perform, step 45, the selected function. For example if the function selected is a franking operation in which the postage amount is entered on the keyboard, no external peripheral device will be required and the circuitry 11 will carry out the franking operation without any communication via the communication port.

It will be appreciated that in order for the general purpose communication port of the franking machine to be configurable to a communication standard, it is only necessary to write into the memory 25 the configuration data for that standard. Accordingly additional standards, changes to standards or newly devised standards can be accommodated by writing new data into the memory. In addition the memory may be utilised to store variable codes related to different modes of operation of the franking machine and the configuration of the port required for those modes of operation.

Figure 2:
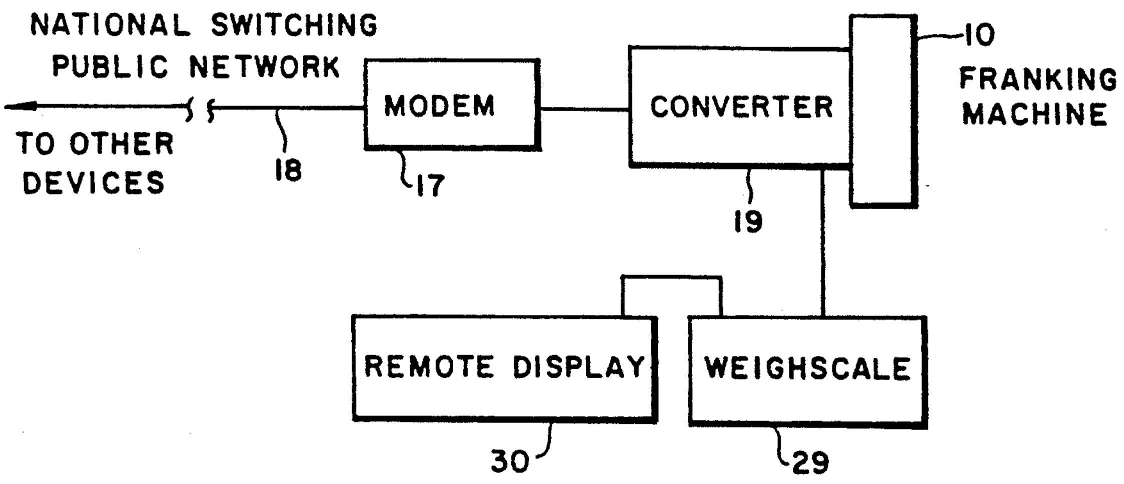
FIG. 2 shows alternative connection of the franking machine by the external interface to other external devices.

Thus it will be understood that data signals may be transmitted to and received from various devices connected to the franking machine by means of the communication port and which operate to communicate to different standards. A modem 17 to enable communication of data via the telephone network 18 may be connected as shown in FIG. 2. The modem may be connected by a multi-way cable to the connector 12 or the modem may be constructed integrally with a connector for direct connection to the connector 12. Commonly available modems utilise a so-called RS232 interface standard for connection to other devices.

Figure 3:
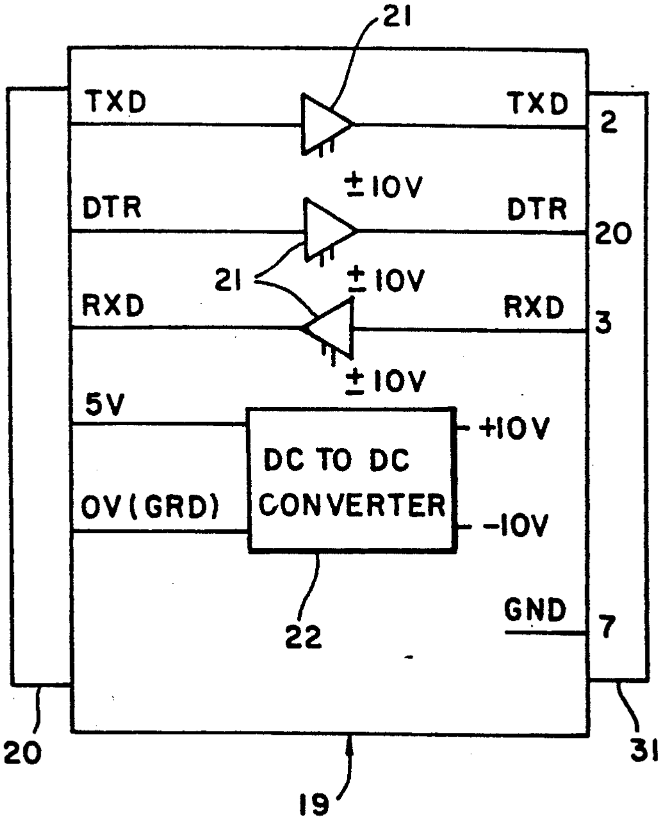
FIG. 3 shows a converter for use with an RS232 communication standard.

While the functions of the lines have been configured to the required communication standard, it may be necessary to convert the signal levels between the device and the franking machine. For this purpose a converter 19 such as that shown in FIG. 3 would be provided for conversion to and from the signal levels of RS232. The RS232 standard utilises a 25 way D-type connector 31 of which pin number 2 carries transmitted data (TXD) to a peripheral device, pin number 3 carries received data (RXD) from the peripheral device and pin number 20 carries a data terminal ready signal (DTR) to the peripheral device. Pin number 7 is connected to ground. These pins 2, 3 and 20 are connected to a connector 20, for mating with the connector 12 of the franking machine, by suitable buffer devices 21 arranged to provide the required signal levels. A suitable semi-conductor device which is available on the market and includes the required buffer devices requires power supplies of +10 volts and −10 volts whereas the potential available from the franking machine is only +5 volts. Accordingly the converter 19 includes a DC to DC converter 22 operating from the +5 volt supply to provide the required +10 and −10 volt supplies. Alternatively, the modem may be constructed to provide the required signals for direct connection to the signal input and output connections of the franking machine.

Figure 4:
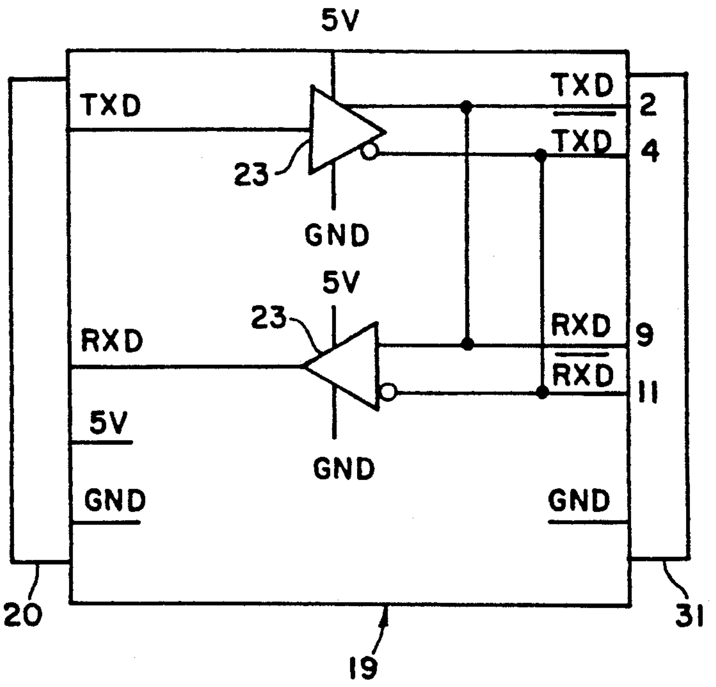
FIG. 4 shows a converter for use with an RS422 communication standard.
Figure 6:
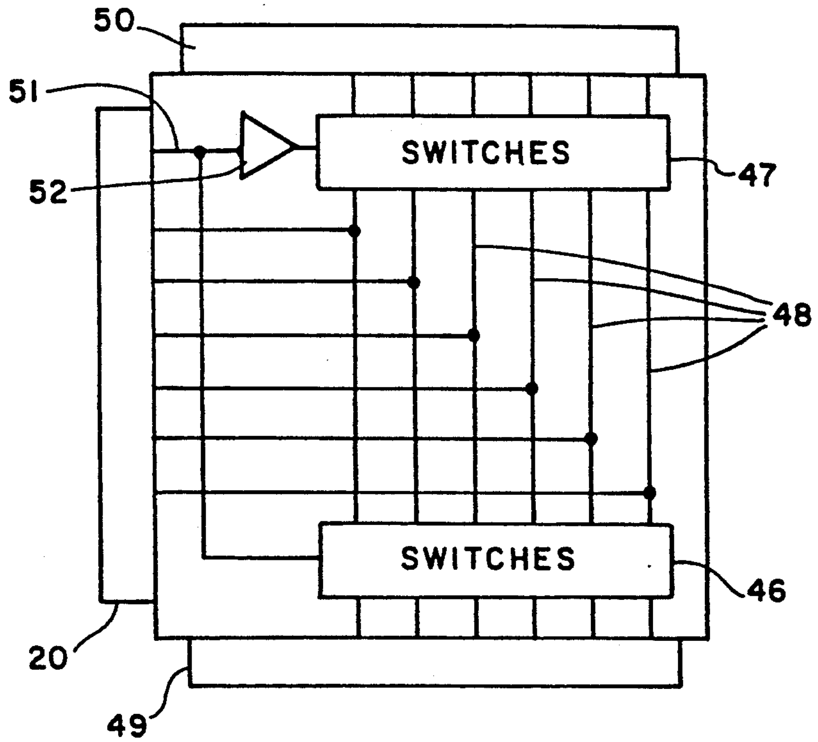
FIG. 6 illustrates a converter to permit simultaneous connection of more than one peripheral device to the general purpose port.
Figure 7:
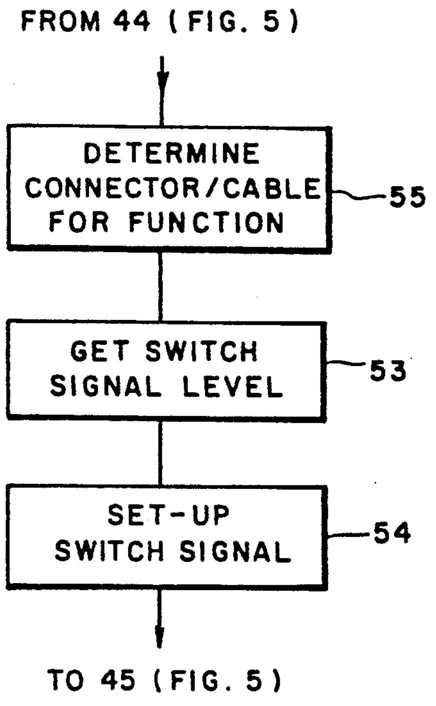
FIG. 7 is a flow chart of steps of a sub-routine comprising additional steps in the flow chart of FIG. 5

Other devices which it is desired to connect to the franking machine may utilise other interface standards such as RS422. Accordingly for such devices an appropriate converter such as that shown in FIG. 4 is provided. The RS422 standard utilises a 15 way D-type connector of which pin numbers 2 and 4 carry transmitted data (TXD) and its inverse (TXD) respectively and pins 9 and 11 carry received data (RXD) and its inverse (RXD) respectively. Signal buffers 23 are provided to convert the signals on pins 9 and 11 to a data input signal for the franking machine and to convert the data output signal from the franking machine to the transmitted data (TXT) and its inverse (TXT) on pins 2 and 4.

Where it is required to connect more than one external device to the franking machine at the same time, either to be operated in conjunction with the carrying out of a single function selected by the user which requires more than one device or where, for convenience, it is required to connect a number of devices to the franking machine at the same time but which are to be operated at different times in conjunction with different functions, a converter is plugged into the connector 12. Referring to FIG. 6, the converter includes a connector 20 for connection to the connector 12 of the franking machine. The converter also includes two selection switch banks 46, 47. One side of the switches of the two banks are connected in common by connections 48 to contacts of the connector 20 and the other side of the switch banks are connected to contacts of connectors 49, 50. One contact of the connector 20 is connected by line 51 to the switch bank 46 directly to control the switches of that bank and is connected through an inverter 52 to the other bank 47 to control the switches of bank 47. When the line 51 is driven high by a control signal from the control circuitry 11, the switches of bank 46 connect contacts of the connector 49 to the contacts of the connector 20 and disable the connections to connector 50 whereas when the line 51 is low the connections to connector 49 are disabled and the connections to connector 50 are enabled and the contacts of connector 50 are connected to the contact of the connector 20. The devices required to be connected to the communications port of the franking machine are connected to the connectors 49, 50 respectively so that the level of line 51 determines which of the devices is operationally in communication with the franking machine at any time. A flow chart of a subroutine for selection of which one of the connectors 49, 50 is operational is shown in FIG. 7. The memory 25 contains a second lookup table indicating the connectors to which the various devices to be used are connected. Accordingly, after determining, step 41 (FIG. 5), that the selected function requires an input/output communication via the communication port 12 and the devices, step 42, required for the function, the control circuitry accesses the second look-up table to determine, step 52, which connector 49, 50 is to be enabled, gets, step 53, the line configuration to drive the line 51 to the required level and sets, step 54, the connection in connector 12 to drive the line 51 to that level. It will be appreciated that, instead of connection of the switches 46, 47 to connectors 49, 50 mounted on the converter, the switches may be connected to cables for connection to the peripheral devices.

A further form of converter which may be utilised for connection to the connector 12 is one which receives and transmits optical signals along optical fibres and contains electro-optic converters to convert the optical signals to electrical signals and vice versa.

Figure 8:
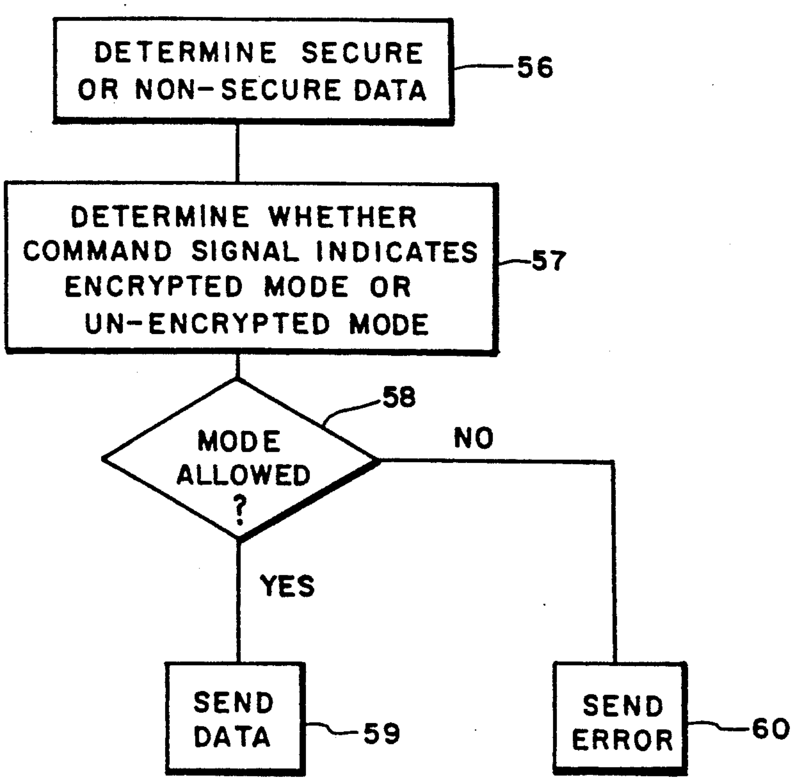
FIG. 8 is a flow chart of steps to determine if a requested data transmission is allowable.

When secure data is to be received on one of the signal input lines of the connector 12, the data is received in encrypted form and the accounting and control circuit 11 is caused by an instruction input on the keyboard or from an external device via the connector 12 to operate under the steps of a stored program to decrypt the input code, validate the data and then carry out an operation such as adding the new credit represented by the received data to the credit currently registered in the descending register. Similarly by keying in an appropriate selected instruction on the keyboard, or by a command signal received by the franking machine by way of the communications port 12, data may be read from a register and after encryption be transmitted via one of the signal output lines of connector 12. The contacts of the connector 12 may be connected to any remote device by connecting an appropriate converter or modem to the connector 12 Alternatively the contacts may be connected to the storage device of a portable member if such a member is plugged into the connector 12. Clock signals and, if required, control signals may be output on others of the output lines to control the reading and writing of data in the portable member. When the franking machine receives a command signal, by way of the communication port, requesting transmission of data, the control circuitry 11 operates a sub-routine to determine if the request is an allowable request. A flow chart of this sub-routine is shown in FIG. 8. Each command signal requesting data from the franking machine will contain information identifying the register from which the data is to be read and will indicate whether output of this data from the franking machine is to be encrypted or un-encrypted. When a command signal requesting data from a register is received, the control circuitry 11 determines 56 whether the data of that register is secure or non-secure and determines 57 whether the mode of transmission indicated by the command signal corresponds to secure or non-secure data. Thus if the command signal requests data from a secure register to be output in encrypted form, the control circuitry will determine 58 that this is an allowable mode of output of that data and will send the data 59 by way of the communication port. However if the command signal requests data from a secure register in un-encrypted form, the control circuitry will determine 58 that this not an allowable mode of output of secure data and will not output the data and will send an error message 60 instead. Similarly when non-secure data is reguested the control circuitry will determine whether the command signal indicates output of the data in un-encrypted form and will output the data only if the command signal requests output of the non-secure data in un-encrypted form.

When non-secure data is to be received or transmitted by way of the connector 12, the accounting and control circuit 11 is instructed by keying an appropriate instruction on the keyboard or by an instruction received via the connector 12 from an external device to cause the accounting and control circuit to operate under the steps of a stored program to, for example, receive signals from a weighscale and input these as a franking value instead of values input by the keyboard. Similarly other input instructions will cause the accounting and control device to transmit selected data to other devices connected to the connector 12.

In addition to the signal input and output connections described hereinbefore, the connector 12 may have further contacts providing connections for a current loop data transmission. The interface circuits 13 include an electro-optic coupler energised by received data on the loop to generate a data input signal to the circuits 11. Data output from the circuits 11 is transmitted to the loop by means of a switching transistor.

The input and output lines respectively from and to the connector 12 for input and output signals such as data and clock and/or control signals may be enabled by appropriate enabling of the gates of the signal buffering 16 of the interface circuits 13 by means of control signals

I claim:

1. A franking machine for franking items of mail including electronic means to carry out accounting functions in relation to usage of the machine in franking operations; storage registers to store account records; said electronic means being responsive to command signals to carry out functions indicated by said command signals; a secure housing securely containing said electronic means and said storage registers; a general purpose communications port comprising a multi-contact connector extending through a wall of said housing to which peripheral devices external to the franking machine may be connected to communicate with said electronic means; a plurality of electrical connections connecting the contacts of the connector to the electronic means; a group of said contacts having signal carrying functions determined by said electronic means; said electronic means being operative in response to a command signal indicating a function to be carried out to determine whether the indicated function requires transmission of signals by way of the general purpose port and a specific peripheral device with which communication is to be effected to set the signal carrying function of the contacts of said group to enable transmission of signals by way of the general purpose port to and from the specific peripheral device and wherein said storage registers store secure and non-secure data and wherein said electronic means is operative in response to said command signal requesting read out of data from said storage registers to determine whether the data requested is secure data and the command requires transmission of the data by way of said general purpose port in encrypted form; said electronic means being operative to transmit secure data only if the command signal indicates transmission of the data in encrypted form.

2. A franking machine as claimed in claim 1 including memory means to store signal carrying functions of the contacts required for communication with at least one peripheral device and wherein the electronic means accesses the memory means to determine the required signal carrying functions of the contacts.

3. A franking machine as claimed in claim 1 wherein a first sub-group of the group of contacts are assigned to carry signals output from the electronic means and a second sub-group of contacts are assigned to carry signals input to the electronic means, said electronic means being operative in response to the command signal to determine the signal carrying function of each contact in each of said sub-groups.

4. A franking machine as claimed in claim 1 wherein the electronic means is operative in response to the command signal indicating a function to be carried out requiring communication with more than one peripheral device by way of the general purpose port to determine the signal carrying function of each contact of the group required for each of the peripheral device with which communication is to be effected; and to set the signal carrying function of each contact of the group to correspond to a first peripheral device and to generate a switch control signal to enable communication with said first peripheral device for first periods in which communication is required with said first peripheral device and to set the signal carrying function of each contact of the group to correspond to a second peripheral device and to set the switch control signal to enable communication with said second peripheral device for second periods in which communication is required with said second peripheral device.

5. A method of controlling communication through a general purpose port of a franking machine with an external peripheral device comprising the steps of:

storing secure and non-secure data in storage registers of the franking machine;

selecting a function to be performed by the franking machine; determining whether said function requires communication with an external device;

in response to determination that communication with an external device is required by said function determining a specific one of a plurality of devices with which communication is required to be effected;

determining signal carrying functions of connections of the port required for communication with said specific device;

setting the signal carrying functions of said connections to correspond to those required by said specific peripheral device and in response to selection of a function requiring read out of data from the storage registers the steps of determining whether the data to be read out is secure data and that the function requires transmission of the data by way of the general purpose port in encrypted form; and transmitting the secure data by way of the general purpose port only if the function specifies transmission of the data in encrypted form.

* * * * *